United States Patent Office 3,652,547
Patented Mar. 28, 1972

3,652,547
3-QUINAZOLINYLPENICILLANIC ACID
Milton Wolf, West Chester, James L. Diebold, Havertown, and Stanley C. Bell, Penn Valley, Pa., assignors to American Home Products Corporation, New York, N.Y.
No Drawing. Filed Dec. 17, 1969, Ser. No. 886,018
Int. Cl. C07d 99/16
U.S. Cl. 260—239.1                           6 Claims

ABSTRACT OF THE DISCLOSURE

This invention is concerned with novel 3-quinazolinylpenicillanic acids.

DESCRIPTION OF THE INVENTION

Novel 3-quinazolinylpenicillanic acid derivatives have been prepared as well as intermediates for their production. The compounds are of the type set forth in Formula I:

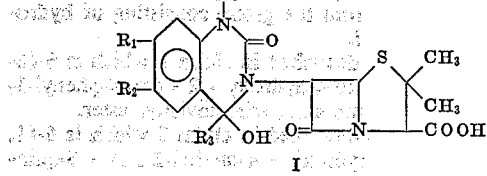

I wherein $R_1$ and $R_2$ are independently selected from the group consisting of hydrogen, halogen, (lower)alkoxy, (lower)alkyl and sulfamoyl; $R_3$ is selected from the group consisting of hydrogen, carboxy, phenyl, halophenyl, (lower)alkoxyphenyl, (lower)alkylphenyl and (lower) alkyl; $R_4$ is selected from the group consisting of hydrogen and (lower)alkyl.

As used herein, the term (lower)alkyl is meant to include straight and branched chain hydrocarbon groups containing one to about six carbon atoms such as methyl, ethyl, n-propyl, i-propyl, hexyl, etc. The terms halo and halogen are used to include chlorine, bromine, fluorine and iodine. By (lower)alkoxy is meant hydrocarbonoxy groups containing one to about six carbon atoms such as methoxy, ethoxy, propoxy, butoxy, etc.

The compounds of the invention may be prepared by reacting the appropriate o-aminoaroyl derivative with 6-isocyanatopenicillanic acid trimethylsilylester. The reaction is conducted in an anhydrous organic solvent such as dry methylene chloride, dry benzene, or dry dimethylformamide. The presence of moisture tends to hydrolyze the ester group off of the 6-isocyanatopenicillanic acid-trimethylsilyl ester and prevent the formation of the compounds of the invention. Also if water is present it will react with 6-isocyanato group to yield a bis-compound. The intermediate 3-quinazolinylpenicillanic acid trimethylsilyl ester may be isolated by removal of the solvent in vacuo. The 3-quinazolinylpenicillanic acids may be then prepared by hydrolyzing the compounds in the presence of water or aqueous inorganic acid such as hydrochloric acid.

The compounds of the invention may be prepared as follows:

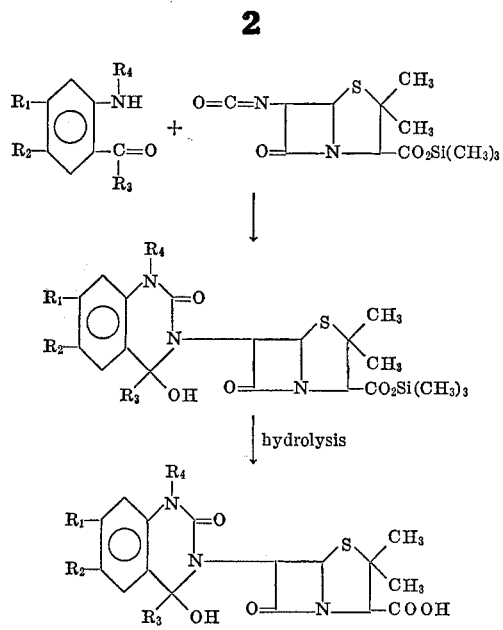

wherein $R_1$, $R_2$, $R_3$ and $R_4$ are the same as hereinabove set forth.

The 6-isocyanatopenicillanic acid trimethylsilyl ester employed as a starting material may be prepared as follows:

A solution of 60 mmoles of 6-aminopenicillanic acid trimethylsilyl ester in 250 ml. of toluene is slowly added dropwise, in a nitrogen atmosphere, to a well stirred mixture of 132 mmoles of triethylamine, about 150 mmoles of phosgene and 90 ml. of toluene; the temperature of the reaction mixture is kept below —40° C. Stirring is continued for 3 hours; the reaction mixture is then filtered under nitrogen at —40° C. while the combined filtrates are evaporated under reduced pressure to a final volume of 70 ml. The solution contains about 0.71 mmoles of the trimethylsilyl ester of 6-isocyanatopenicillanic acid, per ml. of solution.

The compounds of the invention have antibacterial activity and are are useful for the treatment of bovine mastitis. They may be employed in the treatment of bacterial infections such as those amenable to treatment with benzylpenicillin. The compounds are effective in inhibiting *Staph. aureus*, Smith when applied at a concentration of less than 250 mcg./ml. in aqueous media.

The following examples are added to illustrate but not to limit the scope of the invention.

EXAMPLE 1

6 - (6 - chloro - 1,2,3,4 - tetrahydro-4-hydroxy-2-oxo-4-phenyl - 3 - quinazolinyl)penicillanic acid, trimethylsilyl ester To 100 ml. of dry $CH_2Cl_2$ is added 3.82 g. of 2-amino-5-chlorobenzophenone and 5.0 g. of trimethylsilyl-6-isocyanatopenicillanate, and the mixture is refluxed with stirring under nitrogen for 6 hours. A precipitate which separates out of solution during the course of the reaction is collected, washed with dry benzene, and dried under vacuum at 42° C. M.P. 193° d.

*Analysis.*—Calcd. (percent): C, 54.98; H, 5.17; N; 7.70. Found (percent): C, 54.57; H, 4.46; N, 8.52.

EXAMPLE 2

6-(1,2,3,4-tetrahydro-4-hydroxy-2-oxo-4-phenyl-3-quinazolinyl)pencillanic acid, trimethylsilyl ester To 90 ml. of dry benzene were added 2.5 g. of 2-aminobenzophenone and 4.02 g. of trimethylsilyl-6-isocyanatopenicillanate and the mixture is stirred for 2½ hours at ambient temperature. The reaction mixture is placed in the —10° C. cold room overnight and after thawing the benzene is removed in vacuo. The oily residue is dissolved in anhydrous ether, filtered, and the filtrate evaporated under $N_2$. The residue is triturated with pentane, filtered, and dried.

EXAMPLE 3

6-(1,2,3,4-tetrahydro-4-hydroxy-4-methyl-2-oxo-3-quinazolinyl)penicillanic acid

To 100 ml. of dry benzene is added 5.0 g. of trimethylsilyl-6-isocyanatopenicillanate and 2.23 g. of ortho-aminoacetophenone and the mixture is stirred at ambient temperature for 4½ hours. After standing overnight at —10° the frozen mixture is allowed to thaw to room temperature and the benzene is removed in vacuo. The oily residue is triturated with hexane and the solid material is filtered and dried. M.P. 119° d. 51% β-lactam ring intact.

EXAMPLE 4

3-(2-carboxy-3,3-dimethyl-7-oxo - 4 - thia-1-azabicyclo[3.2.0]hept-6-yl)-1,2,3,4-tetrahydro-4-hydroxy - 2-oxo-4-quinazolinecarboxylic acid To a solution of 2.6 g. (0.0127 m.) of potassium isatate in 30 ml. of dimethylformamide is added 4.0 g. (0.0127 m.) of trimethylsilyl-6-isocyanatopenicillanate. The solution is stirred for 18 hours and then poured into 200 ml. of methylene chloride. The solid is then filtered and added to an aqueous solution of sodium bicarbonate. It is precipitated out by adding HCl until a pH of 1.5 is reached.

EXAMPLE 5

The following compounds are prepared by procedures analogous to Example 4:

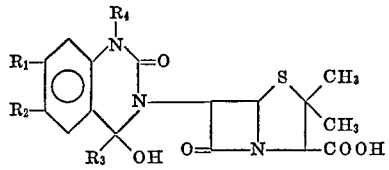

| $R_1$ | $R_2$ | $R_3$ | $R_4$ |
|---|---|---|---|
| H | —Br | COOH | H |
| H | F | $CH_3$ | $CH_3$ |
| $CH_3O$ | $CH_3O$ | $C_2H_5$ | $CH_3$ |
| H | I | $C_3H_7$ | $C_2H_5$ |
| $C_2H_5O$ | H | $C_4H_9$ | $C_2H_7$ |
| $CH_3$ | $CH_3$— | —C₆H₄—F | H |
| H | $C_2H_5$ | —C₆H₄—Cl | H |
| H | $C_3H_7$ | —C₆H₄—I | $CH_3$ |
| H | $C_4H_9$ | H | H |
| H | $NH_2SO_2$ | —C₆H₄—$OCH_3$ | H |
| H | $C_3H_7O$ | —C₆H₄—$OC_2H_5$ | H |
| H | $C_4H_9O$ | H | $C_2H_5$ |
| Cl | Cl | —C₆H₄—$OC_3H_7$ | H |
| $C_2H_5$ | H | —C₆H₄—Cl | $CH_3$ |
| $C_3H_7$ | Cl | —C₆H₄—$CH_3$ | H |
| $C_4H_9$ | H | —C₆H₄—$C_2H_5$ | H |
| $NH_2SO_2$ | H | H | $C_4H_9$ |
| H | H | —C₆H₄—$C_3H_7$ | H |
| $C_3H_7O$ | H | —$C_2H_5$ | H |
| H | $(CH_3)_3C$— | H | H |

What is claimed is:

1. A compound selected from the group having the formula:

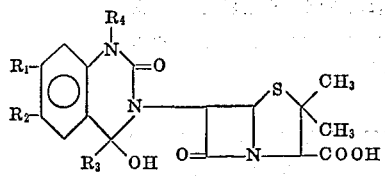

wherein $R_1$ and $R_2$ are independently selected from the group consisting of hydrogen, halogen, (lower)alkoxy, (lower)alkyl and sulfamoyl; $R_3$ is selected from the group consisting of hydrogen, carboxy, phenyl, halophenyl, (lower)alkoxyphenyl, (lower)alkylphenyl and (lower)alkyl; $R_4$ is selected from the group consisting of hydrogen and (lower)alkyl.

2. A compound as described in claim 1 which is 6-(6-chloro-1,2,3,4-tetrahydro-4-hydroxy - 2 - oxo-4-phenyl-3-quinazolinyl)penicillanic acid, trimethylsilyl ester.

3. A compound as described in claim 1 which is 6-(1,2,3,4-tetrahydro - 4-hydroxy - 4-methyl-2-oxo - 3-quinazolinyl)penicillanic acid.

4. A compound as described in claim 1 which is 6-(1,2,3,4-tetrahydro-4-hydroxy - 4 - methyl-2 - oxo-3-quinazolinyl)penicillanic acid.

5. A compound as described in claim 1 which is 3-(2-carboxy-3,3-dimethyl-7-oxo - 4 - thia-1-azabicyclo[3.2.0]hept-6-yl)-1,2,3,4-tetrahydro - 4-hydroxy - 2-oxo-4-quinazolinecarboxylic acid.

6. A compound selected from the group having the formula:

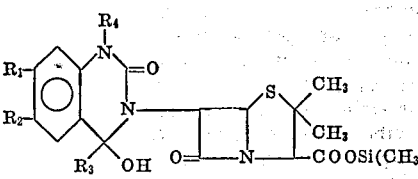

wherein $R_1$ and $R_2$ are independently selected from the group consisting of hydrogen, halogen, (lower)alkoxy, (lower)alkyl and sulfamoyl; $R_3$ is selected from the group consisting of hydrogen, carboxy, phenyl, halophenyl, (lower)alkoxyphenyl, (lower)alkylphenyl and (lower)alkyl; $R_4$ is selected from the group consisting of hydrogen and (lower)alkyl.

References Cited

UNITED STATES PATENTS 3,225,058  12/1965  Juby et al. _____ 260—239.1

NICHOLAS S. RIZZO, Primary Examiner

U.S. Cl. X.R.

424—271